US012646674B2

(12) United States Patent
Stevelink et al.

(10) Patent No.: US 12,646,674 B2
(45) Date of Patent: Jun. 2, 2026

(54) ELECTRIC SWITCHING DEVICE WITH IMPROVED ACTUATION MECHANISM

(71) Applicant: EATON INTELLIGENT POWER LIMITED, Dublin (IE)

(72) Inventors: Frans Stevelink, Weersel (NL); Gerard Schoonenberg, Hengelo (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 187 days.

(21) Appl. No.: 18/604,953

(22) Filed: Mar. 14, 2024

(65) Prior Publication Data

US 2024/0312751 A1 Sep. 19, 2024

(30) Foreign Application Priority Data

Mar. 16, 2023 (GB) ...................................... 2303834

(51) Int. Cl.
*H01H 71/70* (2006.01)
*H01H 13/18* (2006.01)
*H01H 13/28* (2006.01)

(52) U.S. Cl.
CPC ............ *H01H 71/70* (2013.01); *H01H 13/18* (2013.01); *H01H 13/28* (2013.01)

(58) Field of Classification Search
CPC ........ H01H 71/70; H01H 13/18; H01H 13/28; H01H 2003/3084; H01H 3/3052; H01H 3/3005; H01H 3/38
See application file for complete search history.

(56) References Cited

U.S. PATENT DOCUMENTS 5,006,682 A * 4/1991 Sloff .................... H01H 3/3052
200/429

FOREIGN PATENT DOCUMENTS

DE 913665 C * 6/1954
DE 915361 C * 7/1954
FR 2512584 A1 * 3/1983 ............. H01H 83/20

* cited by examiner

*Primary Examiner* — Mohamad A Musleh
(74) *Attorney, Agent, or Firm* — LEYDIG, VOIT & MAYER, LTD.

(57) ABSTRACT

Some embodiments relate to an electric switching device, which comprises a switching contact, an actuation mechanism coupled to the switching contact and a motor coupled to the actuation mechanism. The actuation mechanism comprises a first spring, a first actuation plate coupled with the switching contact and a second actuation plate coupled with the motor. The actuation mechanism also comprises a first blocking element, which blocks the first actuation plate in a rotational blocking position and releases the first actuation plate in a rotational release position. The first spring is loaded by a movement of the motor. At some point in time, the second actuation plate or an actuating element connected thereto turns the first blocking element and thus releases the first actuation plate. As a consequence, the first actuation plate starts to move and finally actuates the switching contact.

10 Claims, 7 Drawing Sheets

ELECTRIC SWITCHING DEVICE WITH IMPROVED ACTUATION MECHANISM

CROSS-REFERENCE TO RELATED APPLICATIONS

The present disclosure claims the priority to Great Britain patent application with the filing number 2303834.2 filed on Mar. 16, 2023 with the UK Intellectual Property Office, the contents of which are incorporated herein by reference in entirety.

TECHNICAL FIELD

The presently disclosed subject matter relates to an electric switching device, which comprises a switching contact (or more switching contacts), an actuation mechanism coupled to the switching contact and a motor coupled to the actuation mechanism.

BACKGROUND ART

An electric switching device of the above kind is generally known in prior art. To move the movable contact of a switching device, an actuation mechanism coupled with a motor can be used. To prevent or at least reduce arcing in case of switching (on or off), the movable contact shall move with a sufficient speed. However, that requires high drive powers and without special measures a high power motor. To obviate the need for high power motors, a motor in such an application is often coupled with an actuation mechanism, which converts a comparably slow movement of the motor into a high speed movement of the switching contact. Often, springs are used for this reason, which are loaded by the motor and at a particular point in time release and more or less instantaneously move the movable contact of the switch. In other words, energy loaded into the springs is released within a short time what means high mechanical power. A number of actuation mechanisms have been proposed, which however often are bulky.

DETAILED DESCRIPTION

Accordingly, the aspect of the presently disclosed subject matter is the provision of an improved electric switching device, and in particular the provision of an improved actuation mechanism. In particular, a slim actuation mechanism for an electric switching device shall be provided. More particularly, such an actuation mechanism shall be suitable for retrofitting of manually operated switching contacts.

The aspect of the presently disclosed subject matter is solved by an electric switching device of the type disclosed in the opening paragraph, which comprises

- a first spring,
- a first actuation plate connected to or contacting the first spring and coupled with the switching contact,
- a second actuation plate connected to or contacting the first spring and coupled with the motor, wherein the second actuation plate is spaced from the first actuation plate with at least a part of the first spring in-between, and
- a first blocking element, which comprises a rotatable first flattened shaft (also called as "D-shaft") and a first lever connected to the first flattened shaft and which is designed to block the first actuation plate in a rotational blocking position and to release the first actuation plate in a rotational release position,
- wherein the second actuation plate is movable in a first direction by the motor,
- wherein the first spring or said part thereof upon movement of the second actuation plate in the first direction is loaded,
- wherein the second actuation plate or an actuating element connected thereto upon further movement of the second actuation plate in the first direction contacts the first lever,
- wherein the second actuation plate or the actuating element upon further movement of the second actuation plate in the first direction turns the rotatable first flattened shaft from its rotational blocking position in its rotational release position and
- wherein the first flattened shaft upon reaching its release position releases the first actuation plate, which in turn is moved in the first direction by a release of the loaded first spring or said loaded part of the first spring and as a consequence transfers the switching contact into a first switching state (e.g. into the open state).

A first actuation plate coupled with the switch is held in position by a first blocking element. To initiate a switching operation, the motor moves a second actuation plate thereby loading (e.g. by compressing or tensioning) a first spring arranged between the two actuation plates. At some point in time, the second actuation plate or an actuating element connected thereto turns the first blocking element from a blocking position into a release position and thus releases the first actuation plate. In turn, the first actuation plate forcefully accelerates into a first direction driven by the first spring and as a consequence quickly changes the switching state of the switching contact.

By use of the above measures, a slim, durable and reliably actuation mechanism is presented, which provides a good conversion of a movement of a slow moving motor into a high speed movement of a movable switching contact. Accordingly, arcing can be prevented or at least reduced in case of switch on or switch off without having the need of high power motors. For example, such electric switching devices can be used for low voltage, medium voltage and high voltage, in particular in combination with vacuum interrupters, and can also be embodied as (hard-) gas based switching devices. The coupling between the actuation mechanism and the switching contact or between the actuation mechanism and the motor may comprise but is not limited to linearly movable rods and rotatable levers and other rotating elements.

Further advantageous embodiments are disclosed in the claims and in the description as well as in the figures.

Advantageously, the electric switching device comprises a second blocking element, which comprises a rotatable second flattened shaft and a second lever connected to the second flattened shaft and which is designed to block the first actuation plate in a rotational blocking position and to release the first actuation plate in a rotational release position,

- wherein the second actuation plate is movable in a second direction opposite to the first direction by the motor,
- wherein the first spring upon movement of the second actuation plate in the second direction is loaded,
- wherein the second actuation plate or an actuating element connected thereto upon further movement of the second actuation plate in the second direction contacts the second lever, wherein the second actuation plate or the actuating element upon further movement of the second actuation plate in the second direction turns the rotatable second flattened shaft from its blocking position in its release position and wherein the second flattened shaft upon reaching its release position releases the first actuation plate which in turn is moved in the second direction by a release of the loaded first spring and as a consequence transfers the switching contact into a second switching state (e.g. into a closed state).

In this embodiment, a second blocking element hinders a movement of the first actuation plate in a second direction opposite to the first direction. At some point in time, the second actuation plate or an actuating element connected thereto turns the second blocking element from a blocking position into a release position and thus releases the first actuation plate. In turn, the first actuation plate forcefully accelerates into the second direction driven by the first spring and as a consequence quickly changes the switching state of the switching contact. The second blocking element may provide more design freedom when designing the actuation mechanism.

In yet another advantageous embodiment, the electric switching device comprises a second spring, a third actuation plate connected to or contacting the second spring and coupled with the motor, wherein the third actuation plate is spaced from the first actuation plate with the second spring in-between, and wherein the third actuation plate is movable in a second direction opposite to the first direction by the motor, wherein the second spring upon movement of the third actuation plate in the second direction is loaded and wherein in a case a)

the third actuation plate or an actuating element connected thereto upon further movement of the third actuation plate in the second direction contacts the first lever, the third actuation plate or the actuating element upon further movement of the third actuation plate in the second direction turns the rotatable first flattened shaft from its blocking position in its release position and the first flattened shaft upon reaching its release position releases the first actuation plate which in turn is moved in the second direction by a release of the loaded second spring and as a consequence transfers the switching contact into a second switching state (e.g. closed state) or wherein in a case b)

the electric switching device comprises a second blocking element, which comprises a rotatable second flattened shaft and a second lever connected to the second flattened shaft and which is designed to block the first actuation plate in a rotational blocking position and to release the first actuation plate in a rotational release position, the third actuation plate or an actuating element connected thereto upon further movement of the third actuation plate in the second direction contacts the second lever, the third actuation plate or the actuating element upon further movement of the third actuation plate in the second direction turns the rotatable second flattened shaft from its blocking position in its release position and the second flattened shaft upon reaching its release position releases the first actuation plate which in turn is moved in the second direction by a release of the loaded second spring and as a consequence transfers the switching contact into a second switching state (e.g. closed state).

In this embodiment, two springs and two actuation plates coupled with the motor are used for the actuation mechanism. In case a) there is just one blocking element, whereas in case b) there are two blocking elements.

In yet further advantageous embodiment, the electric switching device comprises a second spring, a third actuation plate connected to or contacting the second spring and coupled with the motor, a fourth actuation plate connected to or contacting the second spring and coupled with the switching contact, wherein the third actuation plate is spaced from the fourth actuation plate with the second spring in-between, and wherein the third actuation plate is movable in a second direction opposite to the first direction by the motor, wherein the second spring upon movement of the third actuation plate in the second direction is loaded, wherein in a case a)

the third actuation plate or an actuating element connected thereto upon further movement of the third actuation plate in the second direction contacts the first lever, the third actuation plate or the actuating element upon further movement of the third actuation plate in the second direction turns the rotatable first flattened shaft from its blocking position in its release position and the first flattened shaft upon reaching its release position releases the fourth actuation plate which in turn is moved in the second direction by a release of the loaded second spring and as a consequence transfers the switching contact into a second switching state (e.g. closed state) or wherein in a case b)

the electric switching device comprises a second blocking element, which comprises a rotatable second flattened shaft and a second lever connected to the second flattened shaft and which is designed to block the fourth actuation plate in a rotational blocking position and to release the fourth actuation plate in a rotational release position, wherein the third actuation plate or an actuating element connected thereto upon further movement of the third actuation plate contacts the second lever, wherein the third actuation plate or the actuating element upon further movement of the third actuation plate in the second direction turns the rotatable second flattened shaft from its blocking position in its release position and wherein the second flattened shaft upon reaching its release position releases the fourth actuation plate which in turn is moved in the second direction by a release of the loaded second spring and as a consequence transfers the switching contact into a second switching state (e.g. closed state).

In this embodiment, two springs and two separate actuation plates driving the switching contact are used. In particular, the actuation plates can be provided for transmitting a movement to the switching contact by a pure push function (but not with a pull function).

Beneficially the first spring and the second spring can be formed by a first part and a second part of a common spring. In this way, just a single spring is needed, wherein the first actuation plate (and eventually the fourth actuation plate) is arranged between said first and second part.

Generally, the first spring and the second spring or the first part and the second part may differ in their length and/or in their spring constant to handle opening and closing of the switching contact differently. For example, the spring, which is provided for opening the switching contact can be made stronger so as to provide a very fast opening movement. In several cases, depending on the contact type, the closing spring can be made stronger in order to create sufficient contact pressure (e.g. for butt contacts).

Advantageously, the actuating element can be embodied as an elastic actuating element and in particular can comprise an actuating element base, an actuating element spring connected to the actuating element base and an actuating element pusher. When the first actuation plate passes the first blocking element or second blocking element or when the fourth actuation plate passes the second blocking element, there may be a time period, in which a movement of the blocking elements is hindered by the actuation plates. To allow a continuous movement of the motor during this pass by or transition, the elastic actuating element is provided.

In another advantageous embodiment, the electric switching device comprises a micro switch, which is designed to interrupt a movement of the motor when the first actuation plate passes the first blocking element or when the fourth actuation plate passes the second blocking element. As stated above, a movement of the blocking elements can be hindered by an actuation plate when the first actuation plate passes the first blocking element or second blocking element or when the fourth actuation plate passes the second blocking element. in this embodiment, the motor does not continue to move but is temporarily switched off by the micro switch. For example, an actuation bump, which is coupled to the first or fourth actuation plate, can act on the micro switch. In principle, the micro switch can be embodied as opener and can be arranged between motor and a power unit. However, the micro switch can also be connected to a motor line, which leads to a control for the motor and switches off the same in this way. Once the first actuation plate has passed the first blocking element, the motor is switched on again and continues to move until its end position.

In one embodiment, the first spring and/or the second spring can be embodied as a longitudinal spring, in particular as a helical spring. Beneficially, these springs can store energy when they are linearly loaded.

In another embodiment, the first spring and/or the second spring can be embodied as a compression spring, tension spring or combined compression and tension spring. In particular, if the first spring and/or the second spring is embodied as a combined compression and tension spring, it can be used for both the first and second direction and hence for switching the switching contact into two different switching states.

In one further embodiment, the motor can be embodied as a linear motor. For example, the motor can be embodied as a pneumatic, hydraulic cylinder or a spindle motor.

BRIEF DESCRIPTION OF DRAWINGS

The presently disclosed subject matter now is described in more detail hereinafter with reference to particular embodiments, which the presently disclosed subject matter however is not limited to.

DETAILED DESCRIPTION

Generally, same parts or similar parts are denoted with the same/similar names and reference signs. The features disclosed in the description apply to parts with the same/similar names respectively same/similar reference signs. Indicating the orientation and relative position is related to the associated figure, and indication of the orientation and/or relative position has to be amended in different figures accordingly as the case may be.

Figure 1:
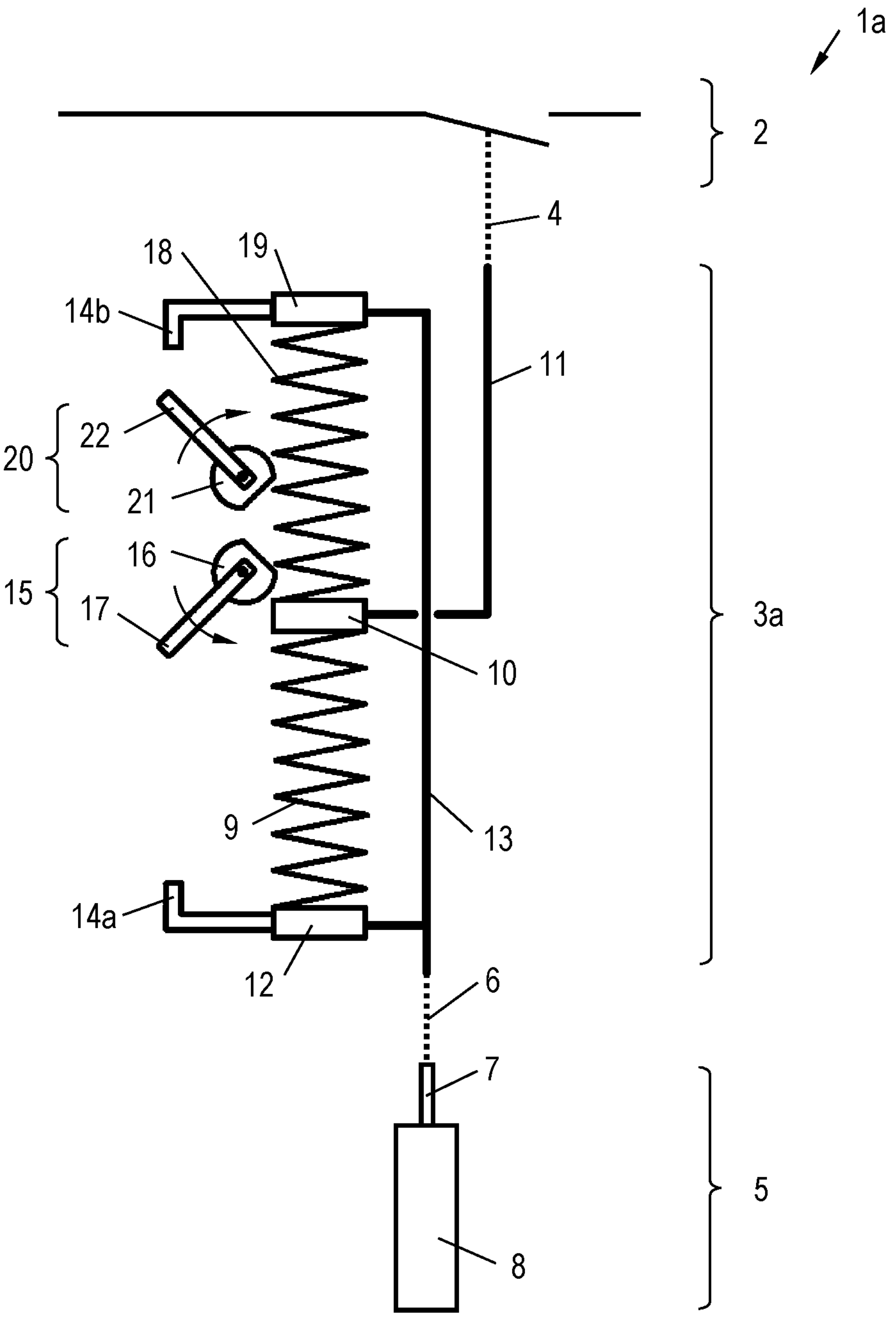
FIG. 1 shows a schematic side view of a first example of an electric switching device.

FIG. 1 shows a first example of an electric switching device 1*a*, which comprises a switching contact 2, an actuation mechanism 3*a* coupled to the switching contact 2 via a switch link 4 and a motor 5 coupled to the actuation mechanism 3*a* via a motor link 6. The switching contact 2, the switch link 4, the motor 5 and the motor link 6 are just symbolically depicted in FIG. 1 and may be embodied in different variants. It should also be noted that although FIG. 1 just shows one switching contact 2, the actuation mechanism 3*a* can also move more than one switching contact 2 simultaneously.

For example, the motor 5 can be embodied as a linear motor (e.g. as a pneumatic cylinder, hydraulic cylinder or as a spindle motor) or also as a rotational motor (e.g. with a crank or a lever mounted to the motor shaft). In FIG. 1, the motor 5 comprises a piston 7 movably arranged in a cylinder 8. In this context it should also be noted that a spindle motor can also be seen as a rotational motor. The motor link 6 can be embodied as a simple rod but also can comprise a more sophisticated mechanism with rotational and/or translatory moving parts. Similarly, the switching contact 2 is just drawn as an electric symbol but may comprise a sophisticated mechanism and also a vacuum chamber for example. The switching contact 2 may be designed for low voltage, medium voltage or high voltage. Just like the motor link 6, the switch link 4 can be embodied as a simple rod but also comprise a more sophisticated mechanism.

The actuation mechanism 1 comprises a first spring 9, a first actuation plate 10, which is connected to or contacts the first spring 9 and which is coupled with the switching contact 2, here by means of a switch push rod 11 and the switch link 4. Furthermore, the actuation mechanism 1 comprises a second actuation plate 12, which is connected to or contacts the first spring 9 and which is coupled with the motor 5, here by means of a motor push rod 13 and the motor link 6. The second actuation plate 12 is spaced from the first actuation plate 10 with the first spring 9 in-between and has an optional first actuating element 14*a*. Moreover, the actuation mechanism 1 comprises a first blocking element 15, which comprises a rotatable first flattened shaft 16 (also called as "D-shaft") and a first lever 17 connected to the first flattened shaft 16. The first blocking element 15 is designed to block the first actuation plate 10 in a rotational blocking position and to release the first actuation plate 10 in a rotational release position. In FIG. 1, the first blocking element 15 is shown in its blocking position. There may also be an optional first return spring (not shown in FIG. 1 but refer to FIG. 7), which forces the first blocking element 15 into its blocking position as illustrated by means of an arrow in FIG. 1.

In addition, the actuation mechanism 1 comprises an optional second spring 18 and a third actuation plate 19, which is connected to or which contacts the second spring 18 and which is coupled with the motor 5, again by means of the motor push rod 13 and the motor link 6. The third actuation plate 19 is spaced from the first actuation plate 10 with the second spring in-between 17 and has an optional second actuating element 14*b*. In fact, the third actuation plate 19 is arranged vis-à-vis of the second actuation plate 12 in view of the first actuation plate 10. Moreover, the actuation mechanism 1 comprises an optional second blocking element 20, which comprises a rotatable second flattened shaft 21 and a second lever 22 connected to the second flattened shaft 21. The second blocking element 20 is designed to block the first actuation plate 10 in a rotational blocking position and to release the first actuation plate 10 in a rotational release position. In FIG. 1, the second blocking element 20 is shown in its blocking position, too. There may also be an optional second return spring (not shown in FIG. 1 but refer to FIG. 7), which forces the second blocking element 20 into its blocking position as illustrated by means of a further arrow in FIG. 1.

In this embodiment, both the first spring 9 and the second spring 19 are embodied as longitudinal springs, in particular as a helical springs. However, other springs can be used as well.

Figure 2A:
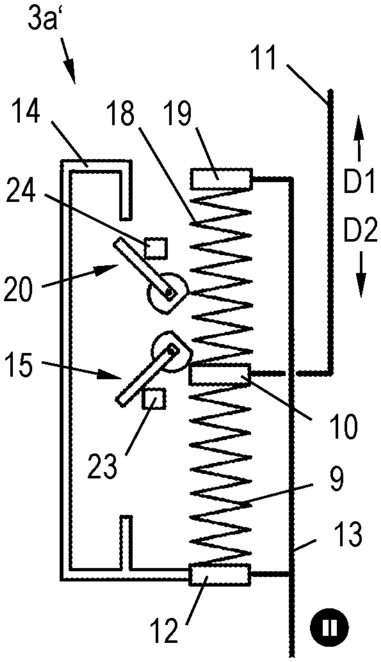
FIG. 2*a* . . . 2*f* illustrate the function of an actuation mechanism similar to that of FIG. 1.

FIGS. 2*a* to 2*f* illustrate the function of the actuation mechanism 3*a*', which is very similar to the actuation mechanism 3*a* of FIG. 1 and which comprises an optional first stop 23 and an optional second stop 24. Instead of two separate actuating elements 14*a*, 14*b*, the embodiment shown in FIGS. 2*a* to 2*f* comprises a single actuating element 14, however, with the same function. FIG. 2*a* shows the electric switching device 1*a* in an idle state as illustrated by the pause symbol.

Figure 2B:
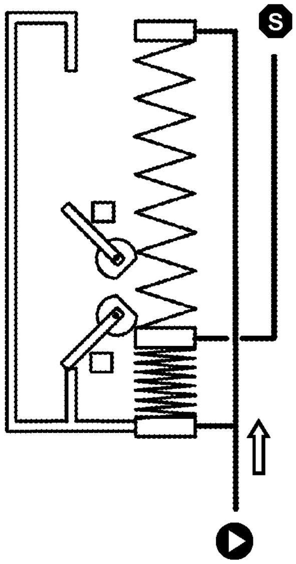

In FIG. 2*b*, the motor 5 starts to move as illustrated by the play symbol. Accordingly, the second actuation plate 12 and the third actuation plate 19 are moved in a first upward direction. As a consequence, the first spring 9 and the second spring 18 are loaded upon movement of the second actuation plate 12 and the third actuation plate 19 in the upward first direction D1. In detail, the first spring 9 is compressed and the second spring 18 is tensioned. The first actuation plate 10 is still blocked by the first blocking element 15 so that the switch push rod 11 does not move as it is illustrated by the stop symbol. As can be seen, the actuating element 14 has reached the first blocking element 15 in FIG. 2*b* but it has not yet turned it. In more detail, the actuating element 14 contacts the first lever 17 of the first blocking element 15 (see FIG. 1 for details of the first blocking element 15).

Figure 2C:
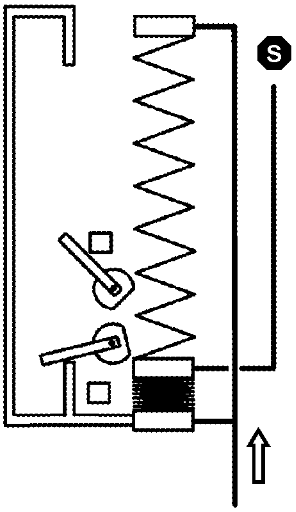

In FIG. 2*c*, the first spring 9 and the second spring 18 have been loaded to their maximum upon further movement of the motor 5. As can be seen in FIG. 2*c*, the switch push rod 11 still does not move as it is illustrated by the stop symbol. However, the actuating element 14 has already turned the rotatable first flattened shaft 16 or the first blocking element 15 respectively from its rotational blocking position in its rotational release position. When the first flattened shaft 16 reaches its release position, it releases the first actuation plate 10 which is the case in FIG. 2*c*. As a consequence, the first actuation plate 10 starts to move in the upward, first direction D1 driven by a release of the loaded first spring 9 and the second spring 18.

Figure 2D:
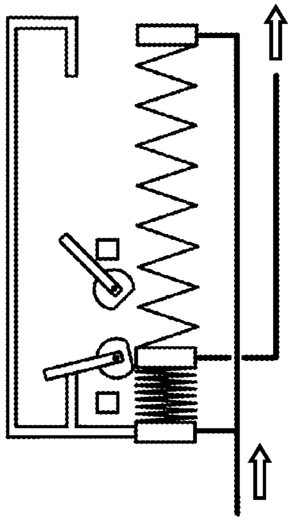

In the state depicted in FIG. 2*d*, the first actuation plate 10 is going to pass the first flattened shaft 16 and continues to move as is illustrated by an arrow next to the switch push rod 11. Additionally, the motor push rod 13 is still moved by the motor 5.

Figure 2E:
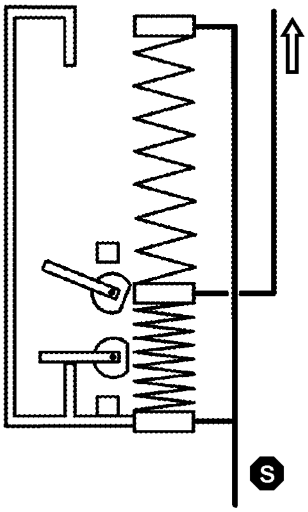

In FIG. 2*e*, the second actuation plate 12 and the third actuation plate 19 have reached their end positions after the actuating element 14 has reached the first stop 23. The motor 5 is switched off in this position, for example by means of a first end switch or by detecting an overload caused by the hindered movement. Accordingly, the movement of the motor push rod 13 stops as is illustrated by the stop symbol. The first actuation plate 10 still moves and is going to pass the second flattened shaft 21 after it has pushed the second flattened shaft 21 out of its moving path. Strictly speaking, the second blocking element 20 is turned into its release position by the moving first actuation plate 10.

Figure 2F:
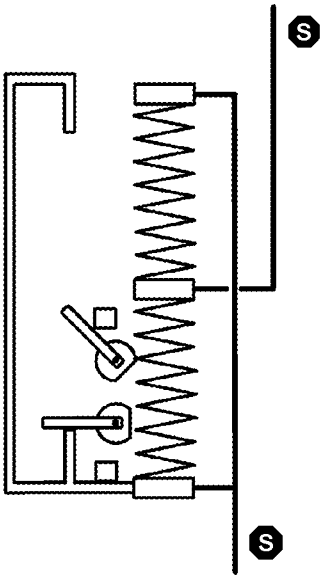

In FIG. 2*f* the first actuation plate 10 has reached its end position as it is illustrated by means of the stop symbol. By the upward movement, the switch push rod 11 via the switch link 4 transfers the switching contact 2 into a first switching state, which in this example is the open state. The second blocking element 20 has moved back to its blocking position driven by the second return spring (not shown). One should note that in FIG. 1 and in FIGS. 2*a* to 2*f* (and the following FIGS. 3*a* to 6*f*), the first (open) switching state and the second (closed) switching state are inversely associated to the position of the switch push rod 11. That means that in FIG. 1 the upper position of the switch push rod 11 is associated with the second (closed) switching state, whereas in FIGS. 2*a* to 2*f* and the following FIGS. 3*a* to 6*f* the upper position of the switch push rod 11 is associated with first (open) switching state and vice versa.

FIG. 2*f* also shows a second idle state, in which the position of the parts of the actuation mechanism 3*a*' are basically mirror inverted in view of the state depicted in FIG. 2*a*. However, one should note for the sake of better understanding, FIG. 2*a* strictly speaking shows a state in which the motor push rod 13 has already been moved upwards a bit and has already left said mirror inverted position. Because of this symmetry, switching on the switching contact 2 just happens like illustrated by FIGS. 2*a* to 2*f* but with changed roles of the parts and inverted moving directions.

In more detail, the second actuation plate 12 and third actuation plate 19 then move in a downward, second direction D2 opposite to the first direction D1 by the motor 5, wherein the first spring 9 and the second spring 18 upon movement of the second actuation plate 12 and the third actuation plate 19 in the second direction D2 are loaded. In detail, the first spring 9 is tensioned and the second spring 18 is compressed now. Upon further movement of the second actuation plate 12 and the third actuation plate 19, the actuating element 14 contacts the second lever 22 and upon further movement turns the rotatable second flattened shaft 21. When the second flattened shaft 21 has turned from the blocking position into its release position, the first actuation plate 10 is released and in turn is moved by a release of the loaded first spring 9 and second spring 18. As a consequence the switching contact is transferred into a second switching state, which in this example is the closed state.

By use of the first spring 9 and the second spring 18, switching takes place very fast.

Figure 3A:
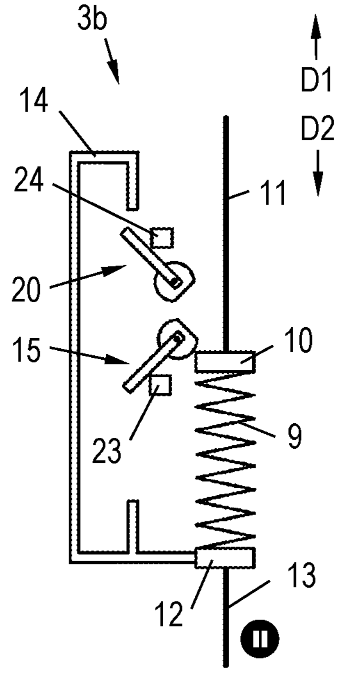
FIG. 3*a* . . . 3*f* illustrate the function of an actuation mechanism with a single spring.
Figure 3B:
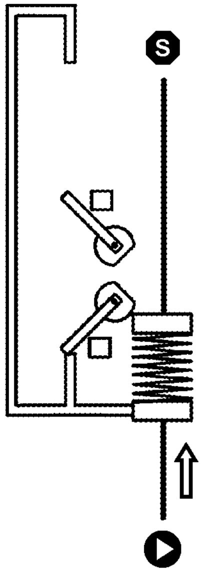
Figure 3C:
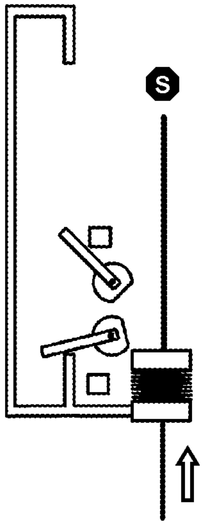
Figure 3D:
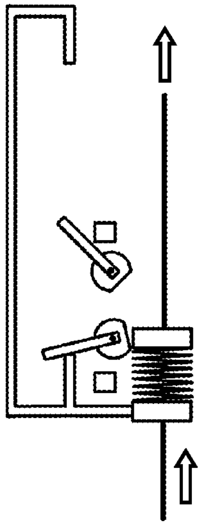
Figure 3E:
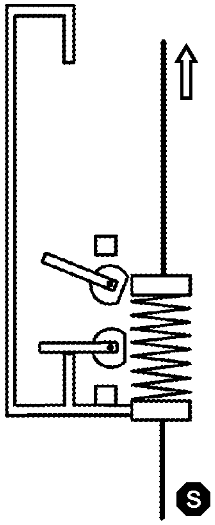
Figure 3F:
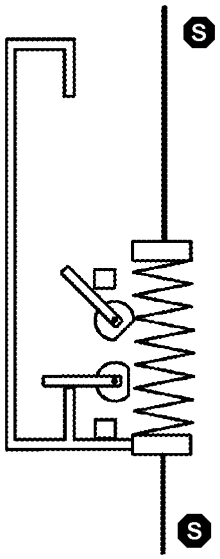

FIGS. 3a to 3f now illustrate an embodiment of an actuation mechanism 3b, which is similar to the actuation mechanisms 3a, 3a' of FIGS. 1 and 2a to 2f. FIG. 3a relates to FIG. 2a, FIG. 3b to FIG. 3b and so forth. As can be seen, the actuation mechanism 3b comprises just a first spring 9 and no third actuation plate 19. Nevertheless, the function of the actuation mechanism 3b is very similar to that of actuation mechanisms 3a, 3a' and almost equals the function of the actuation mechanisms 3a, 3a'. Basically, the only difference is the missing effect of the non-existing second spring 18 and the missing effect of the non-existing third actuation plate 19.

Figure 4A:
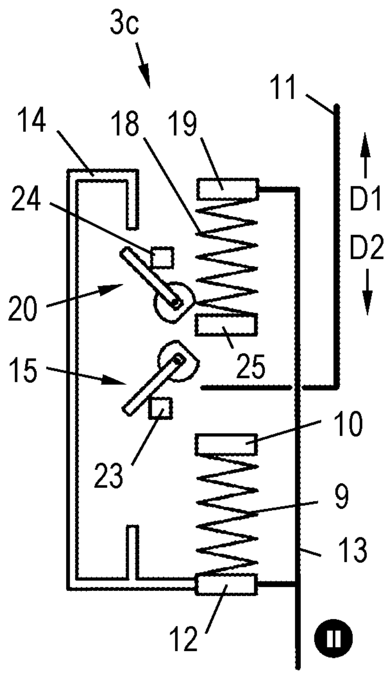
FIG. 4*a* . . . 4*f* illustrate the function of an actuation mechanism with two separate actuation plates for the switch link.
Figure 4B:
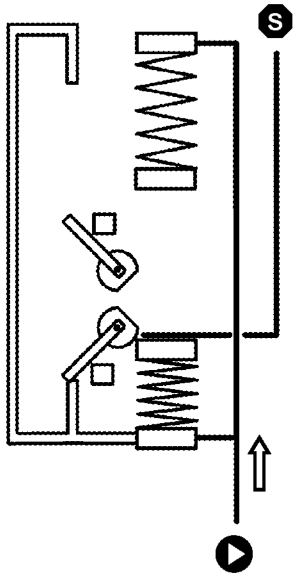
Figure 4C:
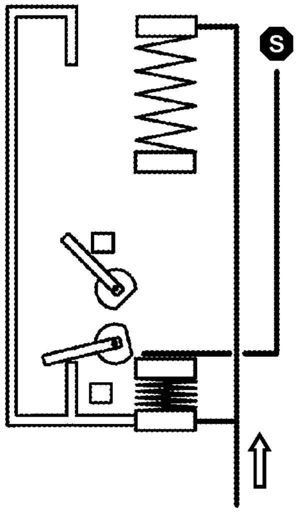
Figure 4D:
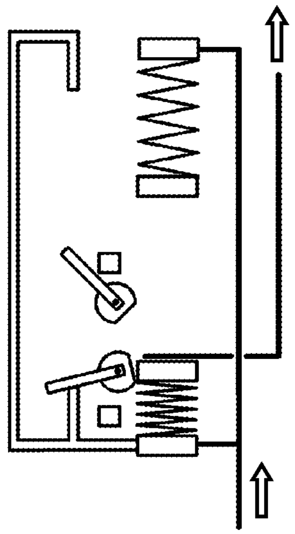
Figure 4E:
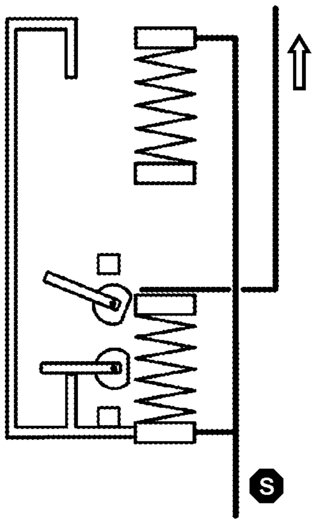
Figure 4F:
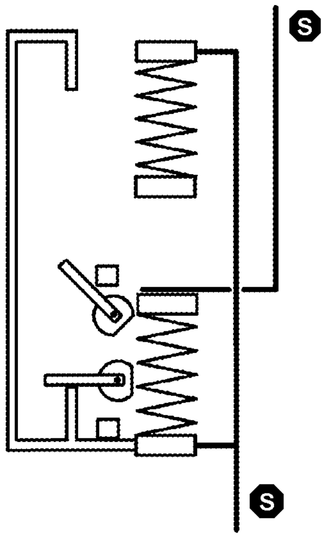

FIGS. 4a to 4f illustrate an embodiment of an actuation mechanism 3c, which is similar to the actuation mechanisms 3a, 3a' of FIGS. 1 and 2a to 2f, too. FIG. 4a relates to FIG. 2a, FIG. 4b to FIG. 2b and so forth. As can be seen, the switch push rod 11 is not fixedly be mounted to the first actuation plate 10, but in principle it may freely move between the first actuation plate 10 fixed to the first spring 9 and a fourth actuation plate 25 fixed to the second spring 18. Nevertheless, the function of the actuation mechanism 3c is very similar to that of actuation mechanisms 3a, 3a' and almost equals the function of the actuation mechanisms 3a, 3a'. Basically, the only difference is that the first actuation plate 10 and the fourth actuation plate 25 can only push the switch push rod 11 (and not pull it like the first actuation plate 10 of actuation mechanisms 3a, 3a' does) and that accordingly there is no tension of the first spring 9 and second spring 18. Moreover, the position of the switch push rod 11 is not linked to the position of the first actuation plate 10 (like this is the case in the actuation mechanisms 3a, 3a') but linked to the position first actuation plate 10 or to the fourth actuation plate 25.

Figure 5A:
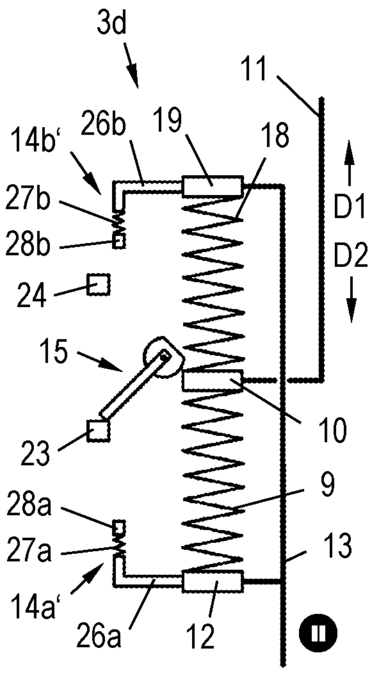
FIG. 5*a* . . . 5*f* illustrate the function of an actuation mechanism with elastic actuating elements.
Figure 5B:
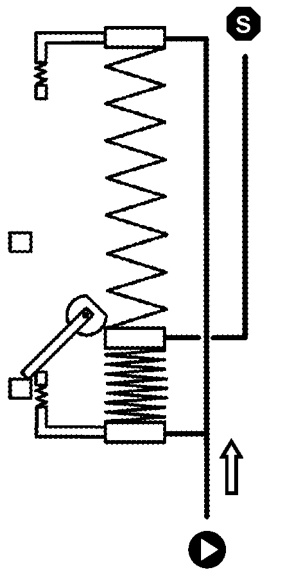
Figure 5C:
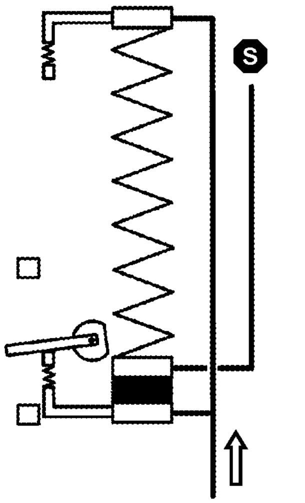

FIGS. 5a to 5f illustrate an embodiment of an actuation mechanism 3d, which is similar to the actuation mechanisms 3a, 3a' of FIGS. 1 and 2a to 2f again. FIG. 5a relates to FIG. 2a, FIG. 5b to FIG. 2b and so forth. As can be seen, the actuation mechanism 3d does not comprise a second blocking element 20 but just a first blocking element 15. Moreover, the actuating elements 14a, 14b are different. In detail, the actuation mechanism 3d has a first actuating element 14a', which comprises a first actuating element base 26a, a first actuating element spring 27a connected to the first actuating element base 26a and a first actuating element pusher 28a connected to the first actuating element spring 27a. Similarly, the actuation mechanism 3d has a second actuating element 14b', which comprises a second actuating element base 26b, a second actuating element spring 27b connected to the second actuating element base 26b and a second actuating element pusher 28b connected to the second actuating element spring 27b. However, the function of the actuation mechanism 3d again is similar to that of actuation mechanisms 3a, 3a'. In contrast, the first blocking element 15 blocks the movement of the first actuation plate 10 both in the upward first direction D1 and in the downward second direction D2 until it is turned by the first actuating element 14a' or second actuating element 14b'. One further difference is that the movement of the motor push rod 13 is not stopped when the first actuating element 14a reaches the first stop 23 or when the second actuating element 14b reaches the second stop 24 but when the first actuating element 14a' (strictly speaking its first actuating element base 26a) or the second actuating element 14b' (strictly speaking its second actuating element base 26b) reaches the first flattened shaft 16 of the first blocking element 15. In these positions, the motor 5 is switched off, for example by means of end switches or by detecting an overload caused by the hindered movement.

Figure 5D:
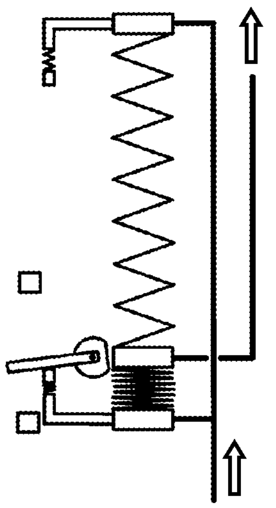
Figure 5E:
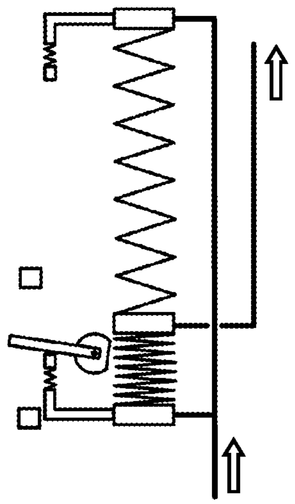
Figure 5F:
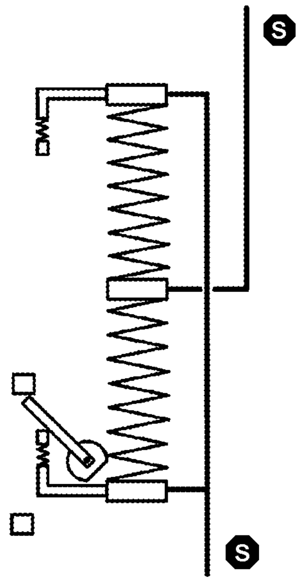

The reason for the provision of the elastic first actuating element 14a' and the elastic second actuating element 14b' is explained by use FIGS. 5b to 5f. It should be noted that the first actuating element spring 27a and the second actuating element spring 27b (or other equivalent elastic elements) are designed in a way that the first blocking element 15 can be turned without considerable compression of the first actuating element spring 27a and the second actuating element spring 27b. Accordingly, the first blocking element 15 starts to rotate in FIG. 5b and continues to rotate until the position depicted in FIG. 5c. Because the first blocking element 15 releases the first actuation plate 10, the first actuation plate 10 starts to move upwards and hinders a further rotation of the first blocking element 15 until the first actuation plate 10 has passed the same. This blocking situation is depicted in FIG. 5d. However, to (better) allow a continuous movement of the motor 5 during this pass by or transition, the elastic first actuating element 14a' and the elastic second actuating element 14b' are provided. As can be seen in FIG. 5d, the first actuating element spring 27a has been compressed, or in other words the first actuating element base 26a has been moved by the motor 5, whereas the first actuating element pusher 28a has not moved. After the first actuation plate 10 has passed the first blocking element 15, the first actuating element spring 27a relaxes again. This situation is depicted in FIG. 5e. In FIG. 5f, the motor push rod 13 has reached its end position. When the motor 5 moves the motor push rod 13 downward in the second direction D2, things are just the other way around.

Figure 6A:
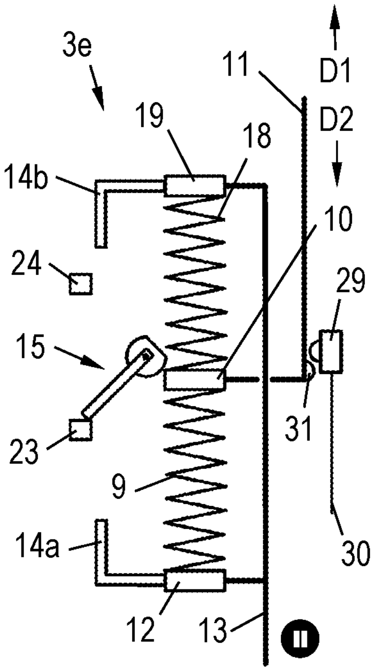
FIG. 6*a* . . . 6*f* illustrate the function of an actuation mechanism with a micro switch for temporarily switching off the motor and FIG. 7 a side view of a more detailed example of an electric switching device.
Figure 6B:
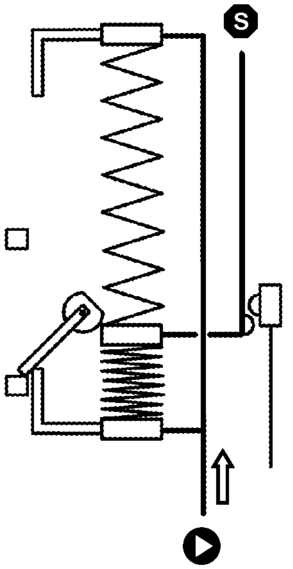
Figure 6C:
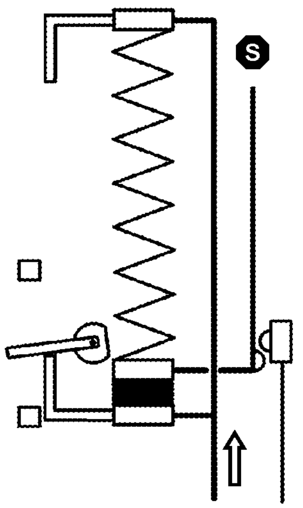
Figure 6D:
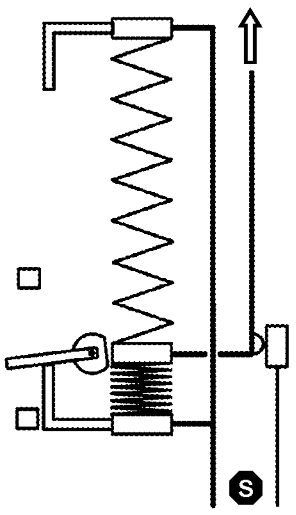
Figure 6E:
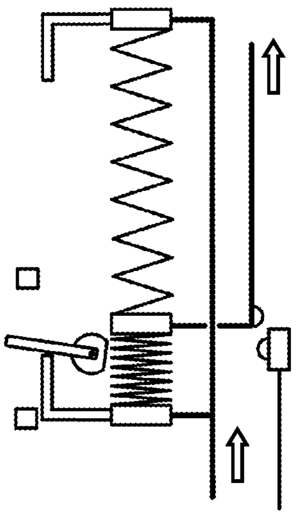
Figure 6F:
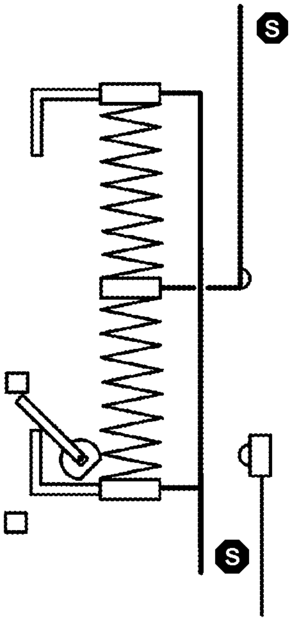

FIGS. 6a to 6f illustrate an embodiment of an actuation mechanism 3e, which is similar to the actuation mechanisms 3d of FIGS. 5a to 5f. FIG. 6a relates to FIG. 5a, FIG. 6b to FIG. 5b and so forth. In contrast, the actuation mechanism 3e has rigid actuating elements 14a, 14b again like the actuation mechanism 3a of FIG. 1 has. A further difference is that actuation mechanism 3e comprises a micro switch 29, a motor line 30 leading to the motor 5 and an actuation bump 31. Like in FIG. 5d, a blocking situation in FIG. 6d is taken into consideration, where the first blocking element 15 cannot be turned further by the motor 5. However, in this embodiment, the motor 5 does not continue to move but is temporarily switched off by the micro switch 29. As can be seen in FIG. 6d, the actuation bump 31 acts on the micro switch 29 in this state. In principle, the micro switch 29 can be embodied as opener and can be arranged between the motor 5 and a power unit for the motor 5. However, the motor line 30 can also be a control line leading to a control for the motor 5. Once the first actuation plate 10 has passed the first blocking element 15, the motor 5 is switched on again as depicted in FIG. 6e and continues to move until its end position depicted in FIG. 6f.

It should be noted that the elastic actuating elements 14a', 14b' of FIGS. 5a to 5f and/or the micro switch 29 of FIGS. 6a to 6f can be applied to the actuation mechanisms 3a . . . 3c of FIGS. 1 to 4f in an equivalent way because similarly said blocking situation can be taken into consideration there. It should also be noted that the first blocking element 15 may simply be denoted as "blocking element 15" in the embodiments of FIGS. 5a to 5f and 6a to 6f because there is just one in these embodiments.

Furthermore, one should note that the embodiments of FIG. 1, FIG. 2a . . . 2f and FIG. 4a . . . 6f are symmetric with respect to the springs 9 and 18. However, this is no necessary condition and the springs 9 and 18 may be embodied differently, in particular in view of their length and/or spring constant. Accordingly, switching on and off can take place differently in alternative embodiments.

Figure 7:
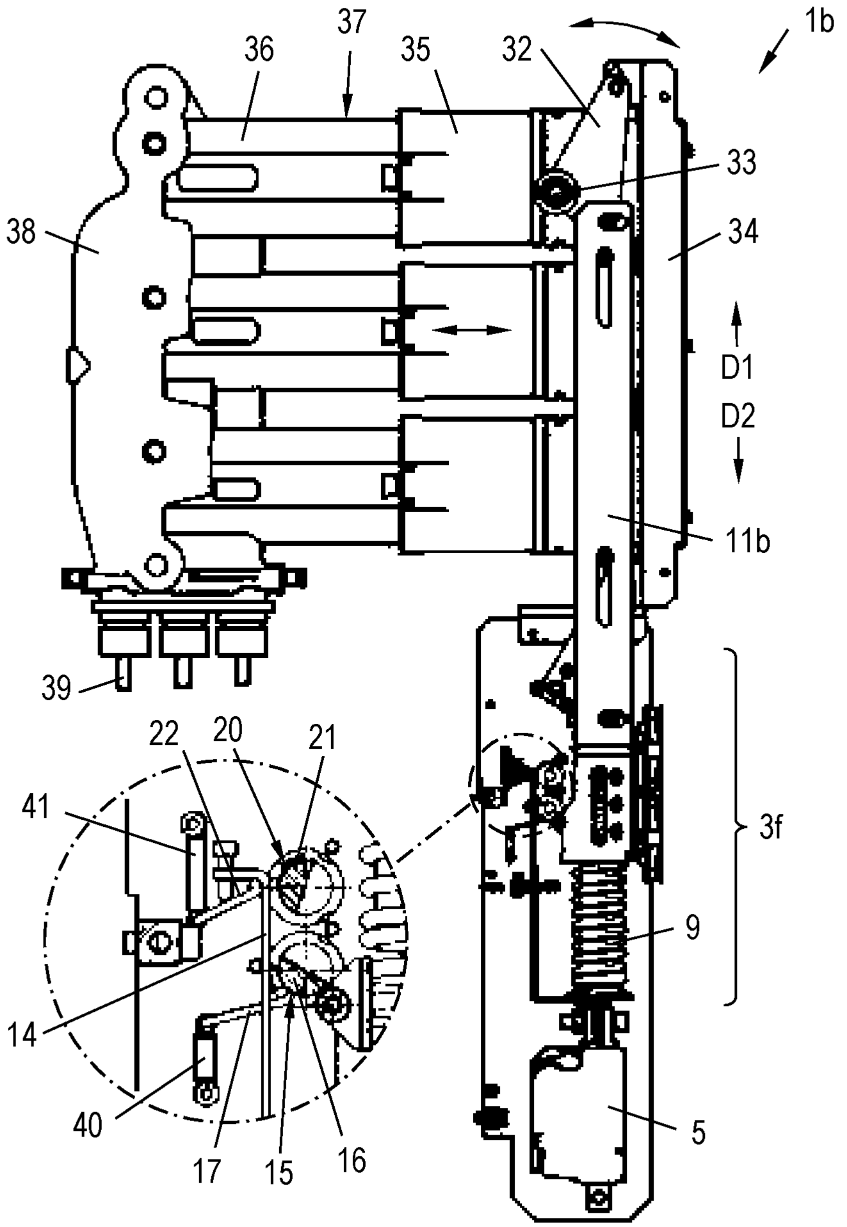

FIG. 7 now shows a more detailed example of an electric switching device 1*b*, which comprises an actuating mechanism 3*f* of the type shown in FIG. 1 and FIG. 2*a* . . . 2*f*, however with a differently shaped push rod 11*b*. The push rod 11*b* is coupled to a pivoted lever 32, which is pivotally mounted in a frame (not shown in FIG. 7) by use of a bearing 33 in this embodiment. A switching frame 34 is connected to the lever 32, too. The switching frame 34 is also connected to a number of switching caps 35, which can be moved on a switch base 36 simultaneously (here in horizontal direction). The switching caps 35 and the switch bases 36 are parts of a number of switches 37, which are mounted to a common frame 38. FIG. 7 also shows terminals 39 for connecting the electric switching device 1*b* to a grid.

In each switch base 36 there is a fixed contact, and in each switching cap 35 there is a movable contact. When the push rod 11*b* is moved upwards in the first direction D1, the switching frame 34 together with the switching caps 35 is moved from the right to the left thus closing the switching contacts 2. When the push rod 11*b* is moved downwards in the second direction D2, the switching frame 34 together with the switching caps 35 is moved from the left to the right thus opening the switching contacts 2. For example, the electric switching device 1*b* can be embodied as three-phase switching device.

In the lower left corner, FIG. 7 in addition shows a detailed view of the trigger mechanism comprising the first blocking element 15 and the second blocking element 20. In addition to the parts already known from FIG. 1, FIG. 7 explicitly depicts a first return spring 40, which forces the first blocking element 15 into its rotational blocking position, and a second return spring 41, which forces the second blocking element 20 into its rotational blocking position.

As can be realized from FIG. 7 the actuation mechanism 3*f* is very slim. That is why it is particularly suitable for retrofitting switch arrangements, which are manually operated originally and where space is limited. In a real application of the electric switching device 1*b* of FIG. 7, a door of a switch gear (not shown) may be arranged just right of the switching frame 34. By use of the pivoted lever 32, the actuation mechanism 3*f* can be arranged right below the switch arrangement, where often space is left in real applications.

In reality, the electric switching device 1*a*, 1*b* and the actuation mechanisms 3*a* . . . 3*f* may have more or less parts than shown in the figures. Moreover, the description may comprise subject matter of further independent embodiments.

It should also be noted that the term "comprising" does not exclude other elements and the use of articles "a" or "an" does not exclude a plurality. Also elements described in association with different embodiments may be combined. It should also be noted that reference signs in the claims should not be construed as limiting the scope of the claims.

LIST OF REFERENCE NUMERALS

1*a*, 1*b* electric switching device
2 switching contact
3*a* . . . 3*f* actuation mechanism
4 switch link
5 motor
6 motor link
7 piston
8 cylinder
9 first spring
10 first actuation plate
11 switch push rod
12 second actuation plate
13 motor push rod
14, 14*a* . . . 14*b*' actuating element
15 first blocking element
16 first flattened shaft
17 first lever
18 second spring
19 third actuation plate
20 second blocking element
21 second flattened shaft
22 second lever
23 first stop
24 second stop
25 fourth actuation plate
26*a*. 26*b* actuating element base
27*a*. 27*b* actuating element spring
28*a*. 28*b* actuating element pusher
29 micro switch
30 motor line
31 actuation bump
32 pivoted lever
33 bearing
34 switching frame
35 switching cap
36 switch base
37 switch
38 common frame
39 terminal
40 first return spring
41 second return spring
D1 first direction
D2 second direction

The invention claimed is:

1. An Electric switching device, comprising:

a switching contact, an actuation mechanism coupled to the switching contact and a motor coupled to the actuation mechanism, characterized in that the actuation mechanism comprises a first spring, a first actuation plate connected to or contacting the first spring and coupled with the switching contact, a second actuation plate connected to or contacting the first spring and coupled with the motor, wherein the second actuation plate is spaced from the first actuation plate with at least a part of the first spring in-between, and a first blocking element, which comprises a rotatable first flattened shaft and a first lever connected to the first flattened shaft and which is designed to block the first actuation plate in a rotational blocking position and to release the first actuation plate in a rotational release position, wherein the second actuation plate is movable in a first direction by the motor, wherein the first spring or said part thereof upon movement of the second actuation plate in the first direction is loaded, wherein the second actuation plate or an actuating element connected thereto upon further movement of the second actuation plate in the first direction contacts the first lever, wherein the second actuation plate or the actuating element upon further movement of the second actuation plate in the first direction turns the rotatable first flattened shaft from its rotational blocking position in its rotational release position and wherein the first flattened shaft upon reaching its release position releases the first actuation plate, which in turn is moved in the first direction by a release of the loaded first spring or said loaded part of the first spring and as a consequence transfers the switching contact into a first switching state.

2. The Electric switching device as claimed in claim 1, wherein the electric switching device comprises a second blocking element, which comprises a rotatable second flattened shaft and a second lever connected to the second flattened shaft and which is designed to block the first actuation plate in a rotational blocking position and to release the first actuation plate in a rotational release position, wherein the second actuation plate is movable in a second direction opposite to the first direction by the motor, wherein the first spring upon movement of the second actuation plate in the second direction is loaded, wherein the second actuation plate or an actuating element connected thereto upon further movement of the second actuation plate in the second direction contacts the second lever, wherein the second actuation plate or the actuating element upon further movement of the second actuation plate in the second direction turns the rotatable second flattened shaft from its blocking position in its release position and wherein the second flattened shaft upon reaching its release position releases the first actuation plate which in turn is moved in the second direction by a release of the loaded first spring and as a consequence transfers the switching contact into a second switching state.

3. The Electric switching device as claimed in claim 1, wherein the electric switching device comprises a second spring, a third actuation plate connected to or contacting the second spring and coupled with the motor, wherein actuation plate in the second direction turns the rotatable first flattened shaft from its blocking position in its release position and the first flattened shaft upon reaching its release position releases the first actuation plate which in turn is moved in the second direction by a release of the loaded second spring and as a consequence transfers the switching contact into a second switching state or wherein in a case b)

the electric switching device comprises a second blocking element, which comprises a rotatable second flattened shaft and a second lever connected to the second flattened shaft and which is designed to block the first actuation plate in a rotational blocking position and to release the first actuation plate in a rotational release position, the third actuation plate or an actuating element connected thereto upon further movement of the third actuation plate in the second direction contacts the second lever, the third actuation plate or the actuating element upon further movement of the third actuation plate in the second direction turns the rotatable second flattened shaft from its blocking position in its release position and the second flattened shaft upon reaching its release position releases the first actuation plate which in turn is moved in the second direction by a release of the loaded second spring and as a consequence transfers the switching contact into a second switching state.

4. The Electric switching device as claimed in claim 1, wherein the electric switching device comprises a second spring, a third actuation plate connected to or contacting the second spring and coupled with the motor, a fourth actuation plate connected to or contacting the second spring and coupled with the switching contact, wherein the third actuation plate is spaced from the fourth actuation plate with the second spring in-between, and wherein the third actuation plate is movable in a second direction opposite to the first direction by the motor, wherein the second spring upon movement of the third actuation plate in the second direction is loaded, wherein in a case a)

the third actuation plate or an actuating element connected thereto upon further the third actuation plate is spaced from the first actuation plate with the second spring in-between, and wherein the third actuation plate is movable in a second direction opposite to the first direction by the motor, wherein the second spring upon movement of the third actuation plate in the second direction is loaded and wherein in a case a)

the third actuation plate or an actuating element connected thereto upon further movement of the third actuation plate in the second direction contacts the first lever, the third actuation plate or the actuating element upon further movement of the third movement of the third actuation plate in the second direction contacts the first lever, the third actuation plate or the actuating element upon further movement of the third actuation plate in the second direction turns the rotatable first flattened shaft from its blocking position in its release position and the first flattened shaft upon reaching its release position releases the fourth actuation plate which in turn is moved in the second direction by a release of the loaded second spring and as a consequence transfers the switching contact into a second switching state or wherein in a case b)

the electric switching device comprises a second blocking element, which comprises a rotatable second flattened shaft and a second lever connected to the second flattened shaft and which is designed to block the fourth actuation plate in a rotational blocking position and to release the fourth actuation plate in a rotational release position, wherein the third actuation plate or an actuating element connected thereto upon further movement of the third actuation plate in the second direction contacts the second lever, wherein the third actuation plate or the actuating element upon further movement of the third actuation plate in the second direction turns the rotatable second flattened shaft from its blocking position in its release position and wherein the second flattened shaft upon reaching its release position releases the fourth actuation plate which in turn is moved in the second direction by a release of the loaded second spring and as a consequence transfers the switching contact into a second switching state.

5. The Electric switching device as claimed in claim 3, wherein the first spring and the second spring are formed by a first part and a second part of a common spring.

6. The Electric switching device as claimed in claim 5, wherein the actuating element is embodied as an elastic actuating element.

7. The Electric switching device as claimed in claim 6, wherein a micro switch, which is designed to interrupt a movement of the motor when the first actuation plate passes the first blocking element or when the fourth actuation plate passes the second blocking element.

8. The Electric switching device as claimed in claim 7, wherein the first spring and/or the second spring is embodied as a longitudinal spring.

9. The Electric switching device as claimed in claim 8, wherein the first spring and/or the second spring is embodied as a compression spring, tension spring or combined compression and tension spring.

10. The Electric switching device as claimed in claim 9, wherein the motor is embodied as a linear motor.

* * * * *